UNITED STATES PATENT OFFICE.

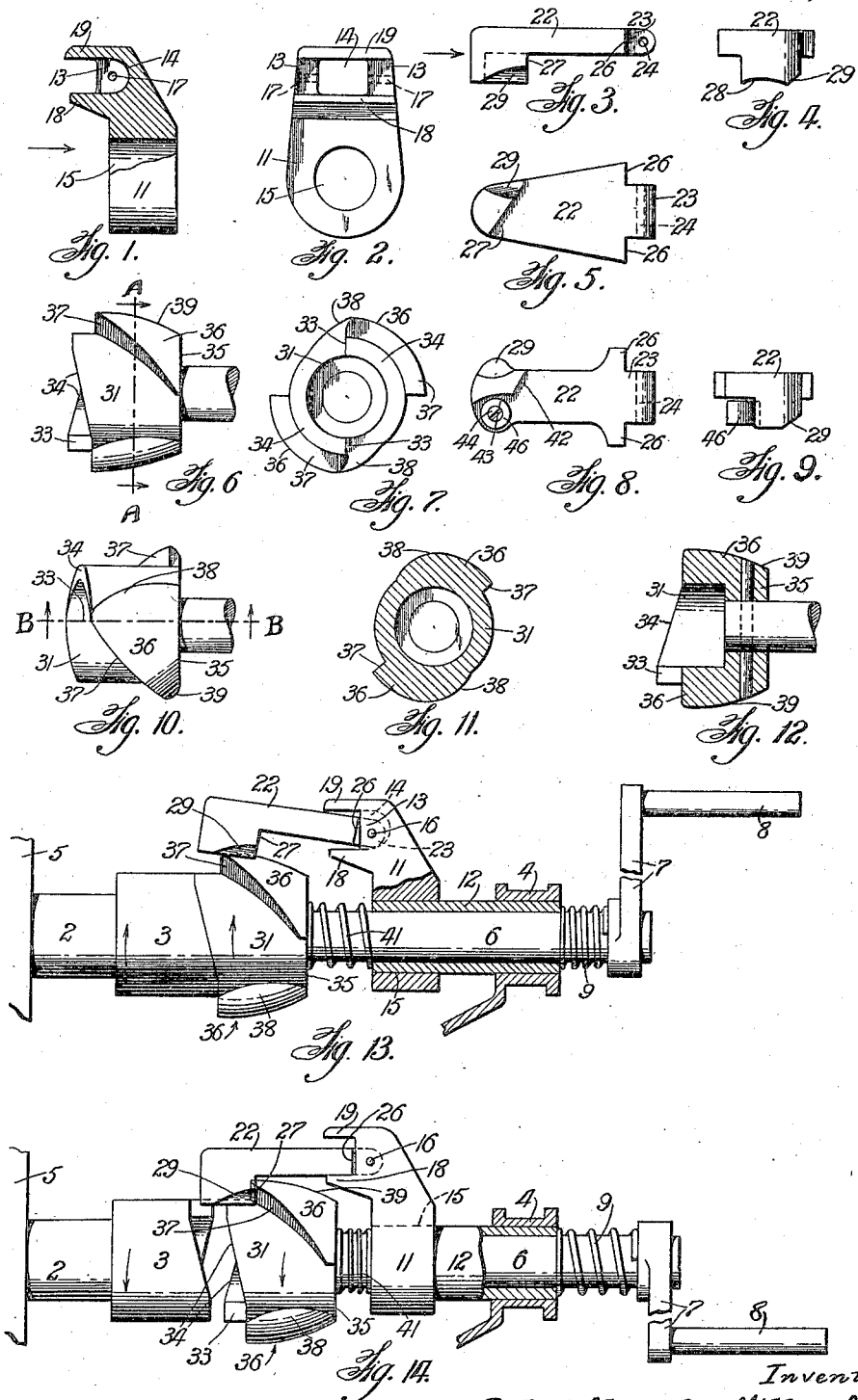

ROBERT A. MILLER-ARGUE, OF ESSENDON, MELBOURNE, VICTORIA, AUSTRALIA.

SAFETY STARTING DEVICE FOR INTERNAL-COMBUSTION ENGINES.

1,390,149.     Specification of Letters Patent.     Patented Sept. 6, 1921.

Application filed October 18, 1920. Serial No. 417,670.

*To all whom it may concern:*

Be it known that I, ROBERT ALEXANDER MILLER-ARGUE, a subject of the King of Great Britain and Ireland, residing in the postal district of Ascot Vale, in the city of Essendon, a suburb of the city of Melbourne, in the county of Bourke, State of Victoria, Commonwealth of Australia (whose post-office address is 386 Ascot Vale road in the said postal district of Ascot Vale), have invented a certain new and useful Improved Safety Starting Device for Internal-Combustion Engines, of which the following is a specification.

This invention relates to internal combustion engine starting or cranking devices of the well-known type used in motor vehicles and comprising a starting handle carrying a clutch member or dog adapted to be engaged with a corresponding clutch member or pin outstanding from the crank shaft of the engine whereby said shaft is initially turned by hand to start the engine.

A serious objection to such devices as at present employed is the liability of injury to the hand or arm of the operator in the event of the engine back-firing while the operator's hand is on the starting handle. This is due to the continued engagement of the clutch members on the starting handle and engine shaft when the sudden reverse movement of said shaft, due to the back-fire takes place, the force of such sudden reverse movement being thus communicated to the operator.

The object of the present invention is to provide a simple, effective and inexpensive means whereby the starting handle is automatically and instantaneously disengaged from the engine shaft in the event of a back-fire occurring while the engine is being started.

More particularly the invention consists in providing the starting handle or its clutch member with suitable inclined cam faces which coöperate with a declutching element adapted to permit the starting handle to rotate freely in a forward direction while in engagement with the engine shaft to start the engine but by engagement with said inclined cam faces to automatically withdraw the clutch member of the starting handle from engagement with the coöperating clutch member of the engine shaft in the event of the latter being turned in a reverse direction owing to a back-fire. The features of the invention will however, be hereinafter more fully described and defined in the appended claims.

Referring to the drawings which form part of this specification:—

Figure 1 is a part sectional side view of a pawl carrying bracket.

Fig. 2 is a view of said bracket looking in the direction of the arrow in Fig. 1.

Fig. 3 is a side view of a declutching element or pawl.

Fig. 4 is an end view of Fig. 3 looking in the direction of the arrow.

Fig. 5 is an inverse plan of Fig. 3.

Fig. 6 is a side elevation of a starting handle clutch member in accordance with the invention and showing the inclined cam surfaces on said member.

Fig. 7 is an end view of Fig. 6 looking from the left.

Fig. 8 is an inverse plan of a modified declutching element or pawl.

Fig. 9 is an end view of the pawl seen in Fig. 8.

Fig. 10 is a plan of Fig. 6.

Fig. 11 is a cross section on line A—A of Fig. 6.

Fig. 12 is a longitudinal section on line B—B of Fig. 10.

Fig. 13 shows the parts of the invention assembled and the respective clutch members of the engine shaft and starting handle in engagement to start the engine. The declutching element or pawl is raised to allow the starting handle to be rotated in a forward direction.

Fig. 14 shows the two clutch members disengaged as in the event of a back-fire the starting handle clutch member being forced out of engagement with the engine shaft clutch member by the pawl engaging one of the inclined cam faces of the starting handle.

In the drawings the numeral 2 indicates the crank shaft of an internal combustion engine 5 said shaft carrying the usual clutch member 3 which may be either in the form of a toothed element or dog as shown or may consist of a pin or abutment projecting radially from the shaft in conventional manner.

The usual bearing for the starting handle is indicated at 4 the spindle of said handle at 6, its crank arm at 7, and the starting handle proper at 8. The starting handle is normally held out of engagement with the engine shaft by means of a spring 9 in the usual way.

Secured to the bearing 4 or an extension thereof or to any other convenient object is a stationary bracket or support 11. This preferably encircles the spindle 6 of the starting handle as in Figs. 13 and 14 which illustrate the starting handle bearing of a well-known type of motor vehicle, having an extended sleeve 12 projecting rearwardly from the bearing 4. For application to engines of this type the bracket 11 may be provided with a hole 15 adapted to fixedly embrace the sleeve 12 whereby the bracket is held firmly in position.

Carried by said bracket are opposite hinge lugs 13 between which is a pocket or recess 14. Across this pocket extends a hinge pin 16 the ends of which are mounted in holes 17 in the opposite hinge lugs 13. The bracket 11 is also preferably provided with a pawl rest 18. Above the pawl rest 18 is a limit stop 19 carried by the bracket 11 and adapted to limit the upward movement of the hinged pawl or declutching element hereinafter described.

Carried by the bracket or support 11 is a declutching element preferably in the form of a pawl 22 which is provided with a reduced hinging end 23 having therethrough a hinge pin hole 24 to accommodate the hinge pin 16 before mentioned. Outstanding from each side of the reduced end 23 is a thrust shoulder 26 these shoulders being adapted to engage the hinge lug 13 and thus take up any side thrust on the pawl owing to its engagement with the projections hereinafter described on the clutch member of the starting handle.

The underneath surface of the pawl 22 is provided with a depending step or shoulder 27 which is inclined transversely of the pawl as shown clearly in Fig. 5 and is adapted to engage the inclined cam faces hereinafter referred to on the starting handle clutch member. The pawl may also be hollowed on its underneath face as at 28 (Fig. 4) to snugly accommodate the periphery of the starting handle clutch member and the projections thereon.

In addition to the foregoing the side of the pawl is preferably provided adjacent the step 27 with a beveled rear edge 29 to permit of the projections on the periphery of the starting handle clutch member passing freely beneath the hinged pawl when the starting handle is turned in a forward direction to start the engine.

Carried by the spindle 6 of the starting handle is the usual clutch member 31 which is provided with teeth having square front or leading faces 33 and inclined rear or trailing faces 34 of conventional design.

According to the invention there outstands from the periphery of the clutch member 31, one or more (preferably two) fins or projections 36. These projections are provided with inclined rear or trailing cam faces 37 which extend spirally around part of the periphery of the clutch member 31 as shown and form an abrupt step or shoulder which is adapted to engage the step or shoulder 27 of the pawl or declutching element 22 to disengage the starting handle from the engine shaft when the latter is rotated in a reverse direction owing to a back-fire.

The fins or projections 36 are also provided with beveled or rounded leading faces 38 these beveled faces being adapted to lift the hinged pawl 22 to permit the clutch member 31 to pass freely beneath said pawl when the starting handle is turned in a forward direction to start the engine. The outer or peripheral faces of the projections 36 also preferably slope or taper downwardly toward the end 35 of the clutch member 31 as indicated at 39.

To absorb any jar or shock in the event of the starting handle being forced outwardly in an axial direction owing to a severe or what is termed a direct back-fire, a cushioning spring 41 is interposed between the clutch 31 and the bracket 11 or in other suitable position. This spring is, however, of less strength than the spring 9 which acts in opposition to it and normally holds the clutch members 3 and 31 out of engagement as before mentioned.

In a modification as shown in Figs. 8 and 9 the declutching element or pawl is provided with an inclined step or shoulder 42 which extends only partly across the underneath face of the pawl and terminates in a shoulder 43 extending approximately lengthwise of the pawl. In this embodiment a roller axle 44 depends vertically from the underneath face of the pawl and carries an antifriction roller 46. This roller is adapted to engage the inclined cam faces 37 of the projections on the clutch member 31 when the later is rotated in a reverse direction, and provides a smoother disengagement of the two clutch members when the engine back-fires in starting. Should the roller 46 happen to break off or become detached from the pawl, the inclined shoulder 42 will engage the cam faces 37 and insure disengagement of the cam members 3 and 31.

In operation, to start the engine the starting handle is pushed inwardly to engage the clutch members 31 and 3 in the usual manner. The starting handle may now be turned in a forward direction to start the engine the hinged pawl or declutching element 22 lifting and allowing the projections or fins 36 of the clutch member 31 to freely pass beneath the pawl. Should however, the crank shaft be turned in a reverse direction owing to a back-fire, the inclined cam faces 34 of said projections engage the inclined face of the shoulder 27 or the anti-friction roller 46 on the pawl thereby causing the clutch member 31 to be moved in an axial direction and away from the clutch member 3 so that the starting handle is released from the engine shaft and the effect of the back-fire is not communicated to the operator.

The invention may be easily applied to existing engines by merely removing the ordinary clutch member of the starting handle and substituting the clutch member 31 of the present invention. The clutch member 31 may be secured to the spindle of the starting handle by a cross pin 45 or other suitable means. The declutching element or pawl 22 is then mounted on the bracket 11 or other convenient support in proper position for the pawl to coöperate with the inclined cam faces 37 as above described.

It will be obvious that the particular construction above described may be modified or altered in various respects without departing from the spirit and scope of the invention.

Having now described my invention, what I claim is new and desire to secure by Letters Patent is:

1. In a safety starting or cranking device for internal combustion engines, the combination of a starting handle, a clutch member carried thereby, an inclined cam face or faces carried by the starting handle or its clutch member and a declutching element comprising a hinged gravity actuated pawl provided with a step or shoulder having an inclined face adapted to coöperate with the inclined cam face of the starting handle to disengage said clutch member from the engine shaft when the latter is rotated in a reverse direction, for the purpose specified.

2. In a starting or cranking device for internal combustion engines, the combination of a starting handle, a clutch member carried thereby, an inclined cam face or faces carried by the starting handle or its clutch member, a declutching element comprising a hinged gravity actuated pawl adapted to lift to permit the starting handle to be freely turned in a forward direction and an anti-friction roller carried by said pawl and adapted to engage the inclined cam face of the starting handle to disengage the latter from the engine shaft when the latter is turned in a reverse direction, for the purpose specified.

3. In a safety starting or cranking device for internal combustion engines, the combination of a starting handle, a clutch member carried thereby, an inclined cam face or faces carried by the starting handle or its clutch member, a declutching element comprising a hinged gravity actuated pawl adapted to lift to permit the starting handle to turn freely in a forward direction and to engage said inclined cam face to release said clutch member from the engine shaft when the latter is rotated in a reverse direction and a bracket or support carrying said pawl and having a rest adapted to limit the downward movement of the pawl and a limit stop to limit the upward movement thereof.

4. In a safety starting or cranking device for internal combustion engines, the combination of a starting handle, a clutch member carried thereby, an inclined cam face or faces carried by the starting handle or its clutch member, a declutching element comprising a hinged pawl adapted to lift to permit the starting handle to turn freely in a forward direction and to engage said inclined cam face to release said clutch member from the engine shaft when the latter is rotated in a reverse direction, said pawl being provided with a reduced hinging end and thrust shoulders outstanding from said reduced end and a bracket or support having hinging lugs to which the pawl is hinged said lugs being disposed adjacent said thrust shoulders for the purpose specified.

5. In a starting device for internal combustion engines, the combination of an engine shaft having a clutch member thereon; a starting handle having a clutch member to coöperate with and engage the clutch member of the engine shaft, said handle being axially movable and said clutch member being adapted to engage when the handle is moved axially; spirally shaped cams on said handle clutch member; and means for engaging said cams to automatically withdraw said handle clutch member from the engine shaft clutch member when the latter back-fires during starting, said means and cams permitting the handle to be moved to bring its clutch member into engagement with the engine shaft clutch member by a simple axial non-rotating movement.

In testimony whereof I affix my signature.

R. A. MILLER-ARGUE.

Witness:
EDWIN PHILLIPS.